United States Patent [19]
Paulson et al.

[11] 3,807,914
[45] Apr. 30, 1974

[54] CAVITY PRESSURE CONTROL SYSTEM

[75] Inventors: Donald C. Paulson; Rodney J. Groleau, both of Southington, Conn.

[73] Assignee: Control Process. Incorporated, Plantsville, Conn.

[22] Filed: Dec. 4, 1972

[21] Appl. No.: 311,799

[52] U.S. Cl................................. 425/144, 425/149
[51] Int. Cl............................ B29f 1/08, B29g 3/00
[58] Field of Search..................... 425/144, 149, 143

[56] References Cited
UNITED STATES PATENTS

| | | | |
|---|---|---|---|
| 3,353,209 | 11/1967 | Schad | 425/149 X |
| 3,283,041 | 11/1966 | Sommerfeld | 425/144 |
| 3,499,189 | 3/1970 | Perras | 425/144 |
| 3,189,948 | 6/1965 | Whitney | 428/144 |

*Primary Examiner*—Milton S. Mehr

[57] ABSTRACT

A mold of the type which is utilized in injection molding machines is provided with a cavity pressure control system. The mold includes at least one cavity for molding articles from fluid synthetic resins wherein the resin may be either a thermoplastic or a thermoset substance. The mold further includes a passage which communicates with the mold cavity for feeding resin thereto. At a point along the length of the passage, preferably adjacent to the entrance of the mold cavity, heating means are provided for heating the resin as it flows thereby. Sensing means are mounted in the mold such as to be capable of sensing the pressure of the resin in the mold cavity. The sensing means and the heating means are connected in circuit relationship with a control means. The control means operates to control the operation of the heating means to vary the temperature of the resin flowing thereby in relation to the pressure of the resin in the mold cavity as sensed by the sensing means whereby to establish and maintain the pressure of the resin in the mold cavity at a predetermined level.

15 Claims, 8 Drawing Figures

3,807,914

CAVITY PRESSURE CONTROL SYSTEM

BACKGROUND OF THE INVENTION

In order to achieve a high degree of reproducibility in molded parts, it is necessary that uniform plastic pressure profiles be maintained in the cavity or cavities being employed to mold the parts. Plastic pressure losses to the cavity tend to fluctuate due to variations in flow passage size, plastic flow rates, mold temperature, and plastic temperature, thus, rendering it very difficult to maintain uniform plastic pressure profiles in a cavity. The result is that the plastic parts molded in such cavities usually have widely varying properties. Acccordingly, the purpose of controlling pressure in each cavity is to control the shrinkage, warpage, optical properties and strength properties of the parts being molded therein and thereby to provide control over the reproducibility of parts.

A variety of different approaches has been tried heretofore by those skilled in the art in an attempt to devise a mold control system which would be capable of ensuring the production on a repetitive basis of parts having the same preestablished properties. It is desired that such systems be operative to provide the desired degree of reproducibility both where parts having the same properties are being produced by means of plural cavities in a single mold as well as where such parts are produced through successive operations of the same mold. However, the systems which have been developed heretodate have demonstrated that there exists a need for an improvement therein. For example, it has been found that generally the systems which are capable of reliably producing molded parts having the desired degree of reproducibility are disadvantageously characterized by the fact that they are relatively expensive to manufacture and employ.

Accordingly, it is an object of the present invention to provide a novel and improved cavity pressure control system for molds of the type utilized in injection molding systems.

It is also an object of the present invention to provide such a cavity pressure control system which is capable of ensuring the production of molded parts having a high degree of reproducibility.

It is another object of the present invention to provide such a cavity pressure control system which is capable of being employed to produce parts having the same properties both where parts are produced by means of plural cavities in a single mold as well as where such parts are produced through successive operation of the same mold.

A further object of the present invention is to provide such a cavity pressure control system which is operable for molding articles from fluid synthetic resins wherein the resin may be either a thermoplastic or a thermoset substance.

A still further object of the present invention is to provide such a cavity pressure control system wherein the pressure of the resin in the mold cavity is controlled by varying the temperature of a heating means located in the path of flow of the resin to the mold cavity.

Yet another object of the present invention is to provide such a cavity pressure control system wherein the pressure of the resin in the mold cavity is controlled by varying the position of the hot tip in the gate relative to the entrance of the cavity to adjust the size of the passage through which the resin flows.

Yet still another object of the present invention is to provide such a cavity pressure control system which is capable of reliably controlling the production of parts having a high degree of reproducibility while yet being relatively inexpensive to manufacture and relatively easy to install in present molds.

SUMMARY OF THE INVENTION

It has now been found that the foregoing and related objects can be readily attained in a cavity pressure control system which is capable of controlling the operation of a mold to ensure the production therefrom of molded parts having a high degree of reproducibility. The cavity pressure control system is embodied in a mold having at least one cavity formed therein and a passage communicating with the mold cavity to provide for a flow of fluid synthetic resin thereto. Sensing means are provided within the mold for sensing the pressure of the resin with the mold cavity, gate or runner. The sensings derived from the sensing means are fed to a control means which is connected in circuit relationship with the sensing means and a heating means. The control means is operable to vary the temperature of the heating means, or the position of the hot tip in the gate in relation to the pressure of the resin sensed in the mold cavity whereby to estabilsh and maintain the pressure profile of the resin in the mold cavity.

In accordance with the preferred embodiment of the invention, the mold is provided with a plurality of mold cavities. At least one of these mold cavities has a cavity pressure control system associated therewith. The system includes a sensing means which is positioned for providing indirectly sensings of the pressure of the fluid synthetic resin in the mold cavity. The pressure in the mold cavity is sensed remotely by means of an ejector pin which has one end supported for movement in juxtaposed relation to a side wall of the mold cavity while the other end thereof engages a suitably configured transducer. The latter is connected in circuit relationship with a control means whereby signals corresponding to the pressure of the resin in the mold cavity are transmitted to the control means. The control means is connected electrically to a heater means which in accordance with one form thereof comprises a heater which is suitably supported such as to be slightly spaced from the entrance of the mold cavity. The control means is operable to vary the temperature of the heater in relation to the pressure of the resin sensed in the mold cavity whereby to vary the amount of heat received by the resin as the latter flows past the heater to the mold cavity.

In accordance with another embodiment of the invention, the control means described in the preceding paragraph is connected to a positioning means which effectuates the movement of a member which is movably mounted within the gate. The control means is operable to provide signals to the positioning means corresponding to the pressure of the resin sensed in the mold cavity. In relation to the signals received thereby, the positioning means causes adjustments to be made in the location of the movably mounted member in the gate relative to the entrance of the mold cavity whereby to vary the size of the flow passage through which the resin passes as it flows to the mold cavity.

DETAILED DESCRIPTION OF THE ILLUSTRATED EMBODIMENT

Figure 1:
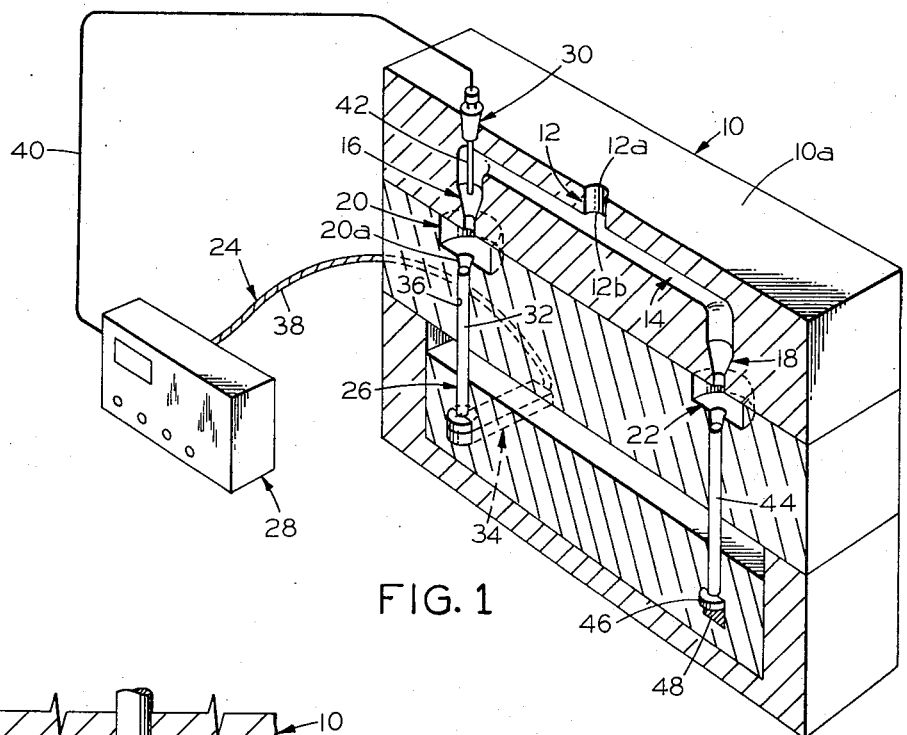
FIG. 1 is a perspective view of the components of a cavity pressure control system in accordance with the present invention illustrated in association with a mold, the latter being shown in cross section for purposes of clarity of illustration.

Referring now to FIG. 1 of the drawings, there is illustrated therein a mold, generally designated by reference numeral 10, of the type which is commonly to be found employed in injection molding machines. For purposes of describing the invention, one particular form of mold 10 has been selected for illustration. However, it is to be understood that the invention is not limited in its applicability to this particular form of mold, but rather that the invention may equally well be utilized with other forms of molds, if so desired. Such other forms of molds include, for example, hot runner molds, partial hot runner molds, insulated molds, and molds which require multi-nozzle injection molding machines. Thus, it can be stated that basically the invention is capable of use with any mold or molding process in which the plastic pressure must be controlled downstream of the heating cylinder.

The mold 10 which is depicted in FIG. 1 as being of multi-sectional construction has a passage formed therein comprising the sprue 12, the runner 14, and a pair of gates 16 and 18. One end 12a of the sprue 12 extends to the external surface 10a of mold 10, as viewed with reference to FIG. 1, while the other end 12b of sprue 12 connects with the runner 14. Runner 14 comprises a conduit which connects the gates 16 and 18 to each other and to the sprue 12. Gate 16 extends between the runner 14 and mold cavity 20 while gate 18 extends between the runner 14 and the mold cavity 22.

Material is fed from a source (not shown) to the sprue 12. The material utilized for this purpose preferably comprises a fluid synthetic resin which may be either a thermoplastic or a thermoset substance. From the sprue 12, the resin flows through the runner 14 to the gates 16 and 18, and therefrom to the corresponding mold cavity 20 and 22, respectively. The mold cavities 20 and 22 are suitably configured whereby to be capable of producing therein suitably shaped molded parts having predetermined properties. To control the shrinkage, warpage, optical properties, appearance and strength properties of the parts being molded in the mold cavities 20 and 22, controlled resin pressures must be maintained in the cavities 20 and 22.

In accordance with one embodiment of the invention, the mold 10 as depicted in FIG. 1 is provided with a cavity pressure control system, generally designated by reference numeral 24. Control system 24 is associated with mold cavity 20 and is operable to control the pressure of the resin in mold cavity 20 such that the pressure follows a predetermined profile to ensure that the parts being molded therein have a high degree of reproducibility. Control system 24 consists basically of the following three functional components: a sensing means 26, a control unit 28, and a heater means 30.

With further reference to FIG. 1, sensing means 26 includes an ejector pin 32 and a force measuring means 34. The ejector pin 32 is supported for movement relative to the mold cavity 20 in an opening 36 provided for this purpose in mold 10. As such, one end of ejector pin 32 is located in juxtaposed relation to the opening 20a provided in mold cavity 20 such that as the resin flows into the cavity 20 and fills the latter, the resin also engages the end of the ejector pin 32 and applies a pressure thereagainst. The pressure exerted by the resin on the end of the ejector pin 32 reflects the pressure of the resin present in the mold cavity 20. The ejector pin 32 is caused to move in relation to the amount of pressure being exerted thereon by the resin. This movement of the ejector pin 32 is sensed, in a manner yet to be described, whereby it is possible to obtain a measurement of the pressure of the resin in the mold cavity 20.

As has been depicted in FIG. 1, the other end of ejector pin 32 engages the force measuring means 34. The latter includes a transducer, of the type which has been known heretofore in the prior art, which operates to transform force measurements into electrical signals. More specifically, the force measuring means 34 functions to measure the strain being imposed thereon by the ejector pin 32, which in turn is a reflection of the force being applied to the ejector pin 32 by the pressure of the resin in the mold cavity 20. For this purpose, the force measuring means 34 includes a conventional type strain gauge (not shown) which is capable of measuring the aforedescribed strain. An output in the form of an electric signal is produced by the force measuring means 34 corresponding to the strain measured by the strain gauge.

The output from force measuring means 34 is transmitted through suitable wiring 38 to the control unit 28. Housed within the control unit 28 is suitable control circuitry (not shown) capable of functioning to receive the output from force measuring means 34 and to generate a control signal in response thereto for controlling, in accordance with one embodiment of the invention, the temperature of the heating means 30. The control signal from control unit 28 is transmitted by means of suitable wiring 40 to the heating means 30. Control unit 28 is preferably provided with adjustment means (not shown) whereby the relationship between the output signal being received thereby and the control signal being produced therefrom may be changed where needed to reflect, for example, the use of different types of resins in molding the parts.

Referring again to FIG. 1 of the drawings, as illustrated therein, the heating means 30 includes a heating element 42 which is suitably supported within a gate 16 such that the free end of heating element 42 is positioned in slightly spaced relation to the entrance of the mold cavity 20. By virtue of the manner in which the heating element 42 is mounted, the resin being fed to the mold cavity 20 from the runner 14 is forced to pass around the heating element 42 as the resin flows through the gate 16 before reaching cavity 20. As a result, heat is transmitted from the heating element 42 to the resin as it flows therearound. Inasmuch as the viscosity of the resin will vary depending on the temperature of the resin, it is possible by increasing or decreasing the power setting applied to the heating means 30 to change the temperature of the heating element 42 and thereby change the amount of heat which will be transmitted from heating element 42 to the resin to thus produce a change in the viscosity of the resin. This, in turn, will effect the pressure of the resin in the mold cavity 20.

In accordance with the embodiment thereof illustrated in FIG. 1, only mold cavity 20 of mold 10 is provided with a cavity pressure control system 24. The mold cavity 22, as will be described hereinafter, is provided with a different form of pressure responsive control system for establishing and maintaining the pressure of resin in the mold cavity 22 at a particular level, i.e., to ensure that the peak cavity pressure reached in the cavity 22 is identical for each molding operation wherein it is desired to mold parts having the same properties. Although for purposes of this description, the mold cavities 20 and 22 have each been illustrated as being provided with different types of control systems, it is to be understood that each of the cavities 20 and 22 is capable of being equipped with a cavity pressure control system 24 if desired.

Figure 2:
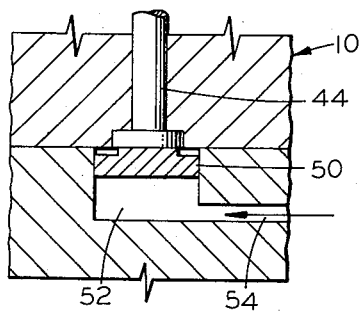
FIG. 2 is a side elevational view of one embodiment of a pressure sensor and force actuator means, illustrated with parts broken away for purposes of clarity of illustration, which is employable in the mold of FIG. 1 in accordance with the present invention.

In a manner similar to that described previously in connection with the description of the control system with which mold cavity 20 is provided, a force transmitting means such as, for example, an ejector pin 44 is movably mounted within mold 10 such that as the resin flows from the runner 14 through gate 18 into cavity 22, and the latter fills with resin, the resin will engage the upper end of ejector pin 44 as viewed with reference to FIG. 1 and apply pressure thereagainst. The effect of this pressure is to apply a downward force on ejector pin 44. At the same time, the other end of ejector pin 44 is being biased upwardly by biasing means 48 which is exerting an upward force against disc 46 and therethrough to ejector pin 44. With regard to the specific nature of the biasing means 48, the latter may take any of the forms illustrated in FIGS. 2-4 of the drawings, each of which will be described in detail hereinafter. The disc 46 may be formed either as an integral part of the ejector pin 44 or it may take the form of a separate member upon which the ejector pin 44 is supported. The disc 46 preferably is made larger in diameter than the ejector pin 44 such that the upper surface of disc 46 as viewed with reference to FIG. 1 will abut against a surface of the mold 10 thereby to limit the upward movement of the ejector pin 44 when the latter is being biased upwardly by biasing means 48 and the mold cavity 22 is empty such that no downward biasing force is being exerted on the ejector pin 44 to counter the upward biasing force being applied thereto. Other means of limiting the upper movement of the ejector pin 44 could obviously also be utilized if so desired without departing from the essence of the invention. The coaction between the biasing means 48, the ejector pin 44, and the resin in the mold cavity 22 is such that when the pressure of the resin in the mold cavity 22 reaches the peak cavity pressure an equilibrium is established between the downward force being exerted on ejector pin 44 by the pressure of the resin in the mold cavity and the upward force being applied to the ejector pin 44 by the biasing means 48. Inasmuch as it is desirable that the point at which the aforedescribed equilibrium will occur be capable of being preestablished by setting the level of force to be exerted by biasing means 48, the latter is preferably provided with adjustment means (not shown) whereby the point at which equilibrium is reached may be adjusted to take into consideration the use of different types of resin, etc. Turning now to a consideration of FIG. 2 of the drawings, there is illustrated therein one particular embodiment of biasing means which may be employed in association with the mold cavity 22 to apply a upward biasing force to the ejector pin 44. Ad depicted therein, mold 10 is provided with an opening 52 in which a member 50 is supported for movement. The opening 52 is suitably dimensioned such that the side walls thereof limit member 50 to only vertical movement as viewed with reference to FIG. 2. The member 50 is positioned in abutting relation to the lower end of ejector pin 44 such that the ejector pin 44 and the member 50 move as a unit, i.e., so that movement of the ejector pin 44 produces a corresponding movement in the member 50 and vice versa. Mold 10 is further provided with a conduit 54, only a portion of which is shown in FIG. 2. One end of conduit 54 communicates with the opening 52 while the other end thereof is connected to a suitable source of pressurized fluid (not shown). In operation, a fluid such as compressed air is fed through conduit 54 to the opening 52. This flow of air imparts an upward force to the member 50 which in turn is applied therethrough to the ejector pin 44. At the same time, the pressure of the resin in the mold cavity is imparting a downward force to the upper end of the ejector pin 44. Accordingly, as the resin begins to flow into the mold cavity, the force being imparted by the air to the lower end of the ejector pin 44 will be greater than the force being applied to the upper end thereof by the resin. Thus, the ejector pin 44 will be biased to its upper position. As the resin begins to fill the cavity, greater and greater pressure is applied to the upper end of ejector pin 44 while the force being exerted by the air remains constant. Therefore, as the force applied to the upper end of the ejector pin 44 increases, the ejector pin 44 will be caused to move downwardly until a point is reached whereat an equilibrium is established wherein the force being applied to the ejector pin 44 by the resin in the mold cavity equals the force being exerted against the ejector pin 44 by the air. The pressure level of the air is preset such that the pressure at which this equilibrium occurs corresponds to the peak cavity pressure of the resin in the mold cavity. Although in the above description the fluid being fed to the opening 52 has been described as being compressed air it is to be understood that other fluids such as, for example, hydraulic fluid etc., could be substituted therefor if so desired. Preferably some form of conventional valving means (not shown) is utilized in association with the conduit 54 or the source of the fluid such that the pressure level of the fluid may be adjusted where needed when it is desired, for example, to employ different types of resin, etc., for molding the parts.

Figure 3:
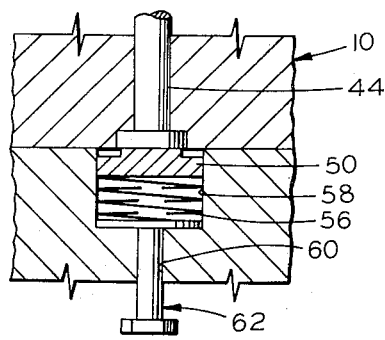
FIG. 3 is a side elevational view of another embodiment of the pressure sensor and force actuator means, illustrated with parts broken away for purposes of clarity of illustration, which is employable in the mold of FIG. 1 in accordance with the present invention.

Considering next FIG. 3 of the drawings, there is illustrated therein another embodiment of biasing means capable of being employed in association with the mold cavity 22 of the mold 10 shown in FIG. 1. Where the same part appears in more than one of the figures of the drawings, this part has been designated by the same reference numeral in each figure where it appears. As shown in FIG. 3 the biasing force applied to the member 50 and therethrough to the ejector pin 44, is provided by means of a spring 56. The latter is retained within the opening 58 provided in the mold such that one end of spring 56 engages the member 50 while the other end of the spring 56 seats against the end of adjustment means 62. The mold 10 is provided with an opening 60, one end of which connects to the opening 58 while the other end extends to the external surface of the mold 10. An adjustment means 62 is received in the opening 60 such that as noted above one end thereof engages the spring 56. The other end of adjustment means 62 is externally accessible such as to provide a means for varying the force capable of being exerted by spring 56 against member 50. The mode of operation of the embodiment of biasing means depicted in FIG. 3 is the same as that described in the preceding paragraph except that the biasing force exerted on member 50 is produced by the spring 56 rather than a pressurized fluid. In both cases, however, the objective is the same, i.e., to establish an equilibrium between the forces being applied at either end of the ejector pin 44 at the point where the force being applied by the resin on the upper end of the ejector pin 44 corresponds to the peak cavity pressure of the resin in the mold cavity.

Figure 4:
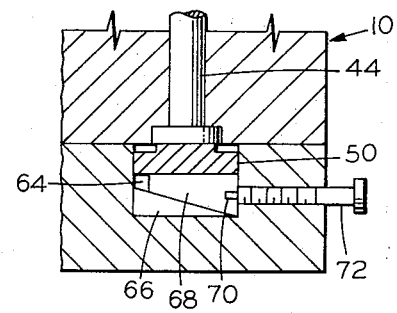
FIG. 4 is a side elevational view of still another embodiment of a pressure sensor and force actuator means, illustrated with parts broken away for purposes of clarity of illustration, which is employable in the mold of FIG. 1 in accordance with the present invention.

With reference to FIG. 4, there is illustrated therein still another embodiment of biasing means employable in association with the mold cavity 22 of the mold 10 shown in FIG. 1. As depicted therein, a member 50 is movable within an opening 64 provided in mold 10. The upward force applied to the member 50 is derived from the wedging action produced by a pair of substantially triangularly shaped members 66 and 68. The latter members 66 and 68 are supported in opening 64 such that the member 68 is capable of being slid along a surface of the member 66. By varying the position of the member 68 relative to the member 66, it is possible to change the amount of force being applied to member 50 and thereby to the ejector pin 44. The sliding movement of member 68 is capable of being controlled through the use of an adjustment means 72. The latter means which is received in an opening provided for this purpose in mold 10 has one end thereof which is positioned such as to be externally accessible while the other end thereof is provided with a projection 70 which is suitably affixed to the member 68. The mode of operation of the aforedescribed biasing means shown in FIG. 4 is the same as that of the biasing means illustrated in FIGS. 2 and 3. The only substantial difference therebetween is the means employed to produce the biasing force being exerted on the member 50. Thus, here also the objective is to establish a balance between the forces being applied at opposite ends of the ejector pin 44 when the peak cavity pressure of the resin in the mold cavity is reached.

Figure 5:
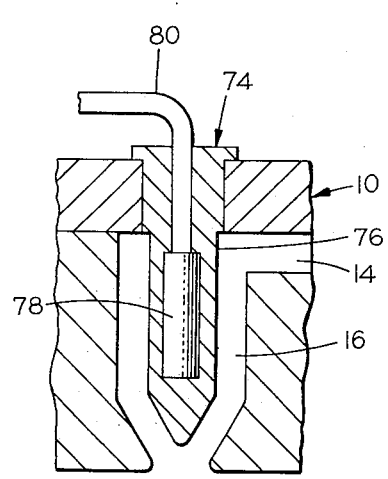
FIG. 5 is a cross sectional view of one embodiment of a heater means which is employable in the cavity pressure control system of FIG. 1 in accordance with the present invention.
Figure 6:
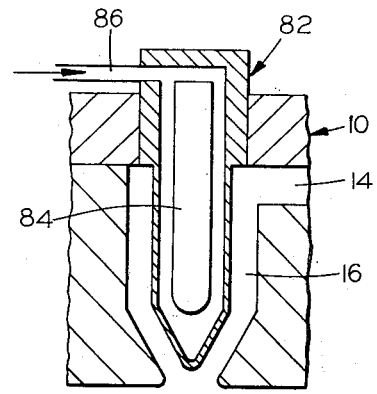
FIG. 6 is a cross sectional view of another embodiment of a heater means which is employable in the cavity pressure control system of FIG. 1 in accordance with the present invention.
Figure 7:
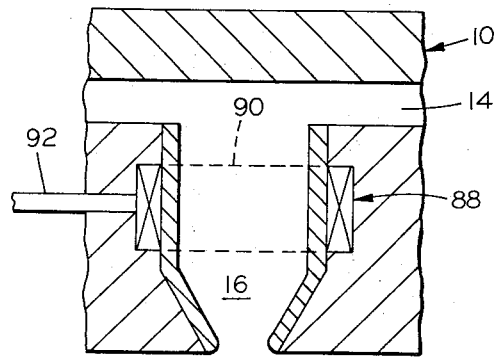
FIG. 7 is a cross sectional view of still another embodiment of a heater means which is employable in the cavity pressure control system of FIG. 1 in accordance with the present invention.

Turning next to a consideration of FIGS. 5, 6 and 7 of the drawings, there are illustrated therein three different embodiments of heater means capable of being employed in the cavity pressure control system 24 which is shown associated with mold cavity 20 in FIG. 1. With particular regard to FIG. 5 of the drawings, the heater means 74 is depicted therein. The latter means 74 consists of an elongated member 76 which is fixedly secured in mold 10 such that the member 76 is positioned within the gate 16 in spaced relation to the entrance of the mold cavity 20. Suitably embodied within the member 76, there is provided an electrical heating element 78. The element 78 is connected by wiring 80 to the control unit 28, which has not been illustrated in FIG. 5 in the interest of clarity of illustration. As such, the temperature of the element 78 is capable of being regulated in accordance with control signals provided from the unit 28. The resin being fed to the mold cavity is made to flow around the member 76 as the resin passes through the gate 16 from the runner 14. Since the member 76 is heated by the heat produced by the element 78, the resin as it flows around the member 76 is heated thereby. The amount of heat supplied to the resin is a function of the temperature of the element 78 which in turn is regulated by the control signals supplied from control unit 28. Further, as set forth previously, since the viscosity of the resin is a function of the temperature, the pressure of the resin in the mold cavity 20 may be varied by varying the temperature of the resin through control of the temperature of the element 76.

In FIG. 6, there is depicted a heater means 82 which is fixedly secured in the mold. The heater means 82 is similar in construction to the heater means 74 in that the heater means 82 also is positioned within the gate 16 in spaced relation to the entrance of the mold cavity 20. However, rather than embodying an electrical heating element the heater means 82 is heated by steam or oil. In accordance with the construction thereof shown in FIG. 6, the steam or oil is provided from a suitable source thereof (not shown) by means of conduit 86 to the interior of heater means 82 wherein it flows around the member 84. Heat from the steam or oil in the interior of heater means 82 causes the external surfaces thereof to become heated. As a result, when the resin passes around the heater means 82 as it flows through the gate 16, it is heated by the heater means 82. Although not shown, it is understood that suitable means would be associated with the heater means 82 to permit regulation of the temperature of the steam or oil whereby to control the amount of heat which the resin receives from the heater means 82.

Regarding FIG. 7, there is illustrated therein a heater means 88 consisting of a band-like electrical heating element 90 which is suitably connected by wiring 92 to a control unit 28, the latter having been omitted from FIG. 1 in the interest of clarity of illustration. The element 90 is mounted in the mold 10 such as to encircle a portion of the side walls of the mold 10 which define the gate 16. As illustrated in FIG. 7, the element 90 is located in spaced relation to the entrance of the mold cavity 20. The side walls of the gate 16 are heated by the element 90 such that as resin flows through the gate 16 from the runner 14 to the mold cavity 20, the resin is heated as it engages the gate side walls. Through the wiring 92 which connects the element 90 to a control unit 28, control signals are fed from the latter to the element 90 whereby to regulate the temperature of the element 90 and thereby control the temperature level of the side walls of the gate 16 which in turn effects the amount of heat being received by the resin as it flows through the gate 16.

Figure 8:
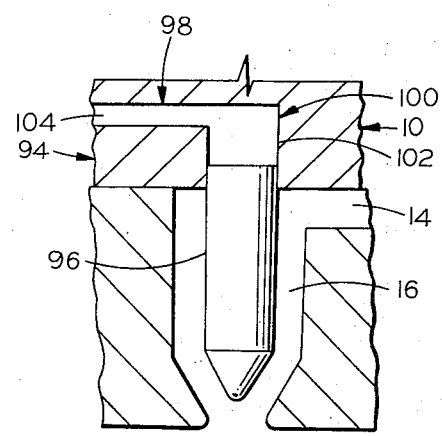
FIG 8 is a cross sectional view of a positioning means for effectuating the movement of a member mounted within the gate which is employable in the cavity pressure control system of FIG. 1 in accordance with the present invention.

Turning now to a consideration of FIG. 8, there is depicted therein another form of means which is also operable to control the pressure profile of the resin in a mold cavity. As noted above, the pressure of the esin in the mold cavity 20 may be controlled by varying the temperature of the resin. In addition however, it is also possible to accomplish this same result by regulating the size of the passage in the gate through which the resin flows before entering the mold cavity. As shown in FIG. 8, for purposes of varying the flow passage size, the gate 16 which is associated with the mold cavity 20 is provided with a positioning means 94. The positioning means 94 comprises an elongated member 96 and means 98 operable for causing movement of the member 96. The member 96 is mounted within the gate 16 of mold 10 such as to be capable of movement relative to the entrance of the mold cavity 20. In accord with the embodiment of positioning means 94 shown in FIG. 8, means 98 includes a chamber 100 having an open end 102 and a passsage 104. The open end 102 of chamber 100 is dimensioned such that as the member 96 is caused to move upwardly, the member 96 is capable of moving into the end 102 with a sliding fit. The passage 104 is connected to a suitable source (not shown) of pressurized fluid.

With regard to the mode of operation of the positioning means 94, the latter functions to vary the size of the flow passage in the gate by varying the position of member 96 in gate 16 relative to the entrance of the mold cavity 20. The position of the member 96 within the gate 16 is determined by the amount of force being exerted upon the upper end thereof, as viewed with reference to FIG. 8, by the pressurized fluid in the chamber 100. Fluid under pressure is supplied through passage 104 to the interior of chamber 100 and flows therefrom into the open end 102 of chamber 100 whereby to cause a downward force to be applied to the member 96. By regulating the pressure of the fluid in chamber 100, it is possible to vary the position of member 96 in gate 16 and thereby the size of the flow passage through which the resin passes. In turn, the pressure of the resin in the mold cavity 20 will vary depending on the size of the flow passage in the gate 16. For purposes of controlling the positioning of the member 96 in accord with the pressure of the resin in the mold cavity 20, control unit 28, which has been previously described, is connected to suitable conventional motorized valve means (not shown) capable of regulating the pressure of the fluid being supplied to the passage 104. More particularly, the pressure of the resin in the mold cavity 20 is sensed by means of sensing means 26. These sensings are transmitted to control unit 28 which in turn produces output signals corresponding to the sensings received from sensing means 26. The output signals from control unit 28 are utilized to vary the pressure of the fluid within the chamber 100. This is done by regulating the aforementioned conventional valve means which determines the relative location of the member 96 in the gate 16, and thereby the size of the flow passage through which the resin flows.

Although not shown, it is to be understood that the member 96 could also be in the form of a "hot tip." That is, the member 96 could embody a heating element in a manner similar to that shown in connection with the member 76 in FIG. 5. Likewise, the member 96 could be provided with suitable internal passages of the type utilized in the heating means 82 which is illustrated in FIG. 6. In either case, however, means would have to be provided whereby to enable the wiring connected to the heating element to move with the member 96, and in the case wherein the member 96 is provided with internal passages the conduit connecting with these passages would also have to be made in such a manner as to enable the conduit to flex as the member 96 moves.

Referring again to FIG. 1 of the drawings, in brief the operation of the cavity pressure control system 24 is such that resin is injected into the cavity 20 in typical injection molding practice. A sensing means 26 measures the pressure of the resin in the mold cavity 20. An electrical signal representing the resin pressure is transmitted by means of suitable wiring 38 to the control unit 28. The pressure profile of the resin in the mold cavity 20 is determined. The objective is to make the cavity pressure profile identical for each cavity where plural cavities are employed to mold parts intended to have the same properties and for each operation of the mold where parts are molded through successive operations of a single cavity in a mold. If the cavity pressure profiles as sensed are not identical, then the power setting to the heater means such as the heater means 30 is adjusted up to increase cavity pressure or down to decrease cavity pressure. These adjustments may be made automatically through the embodiment of suitable circuitry within control unit 28, or manually, if so desired. In the latter case, the adjustment would be made through the use of some form of control unit based on, for example, readings taken from a meter. Or, as described in the preceding paragraphs, the control unit 28 may be connected to positioning means 94 for varying the location of the member 96 and thereby the flow passage size in gate 16.

The mode of operation of the type of pressure control system with which mold cavity 22 is provided is such that resin is transferred from a heating cylinder (not shown) to the cavity 22 in accordance with the usual injection molding practice. The resin in the gate 18 is allowed to solidify due to cooling or due to cure in the case of thermoset resins. When the viscosity of the resin in the gate 18 is sufficiently high to restrict flow out of the cavity 22, the pressure of the biasing means 48 is regulated so that the biasing means 48 exerts a controlled force on the pin 44. The pin 44 then transfers this force to the resin in the cavity 22. Thus, resin pressure in the cavity 22 is individually controlled by increasing or decreasing the force setting of the biasing means 48. Although only one ejector pin 44 has been illustrated being used with the cavity 22, it is to be understood that for large cavities it may be desirable to employ a plurality of pins therewith and in which case a plurality of biasing means could also be utilized such that each pin had its own biasing means associated therewith.

Although one specific form of sensing means has been described hereinabove and has been illustrated in FIG. 1 for use in the cavity pressure control system 24, any sensing device which can measure force or pressure from resin contained in an injection mold or runner system is capable of being utilized therein. Such sensing devices include strain gauges, piezoelectrical, and transistor-type force or pressure measuring devices. The force or pressure may be sensed directly from the resin in the mold cavity or it can be sensed remotely, using ejector pins, dummy pins or similar force transmitting devices. Further, the sensing device can be an integral part of the mold, or the measuring instrument may be a slide transducer or button transducer. Diaphragm transducers which sense resin pressure directly at the cavity surface or within the cavity are also intended to be included. The sensing devices are, in turn, attached to suitable readout and control equipment.

A variety of different types of heater means can be utilized in conjunction with the cavity pressure control system 24 to control the temperature of heating elements so as to adjust the pressure of the resin in the mold cavity. Such heater means include electrical heating cartridges or bands, oil or other fluid heating systems, or steam or other gaseous heating medium. Control over the heating means is provided from a control unit through suitable circuitry. The control is adjusted in accordance with measurements of the pressure of the resin in the mold cavity obtained utilizing the aforedescribed sensing devices.

In systems wherein the pressure of the resin in the mold cavity is controlled by varying the relative position of a member in the gate, there are many different types of means which can be employed for the purpose of accomplishing the desired movement of thee member. Hereinabove, reference has been made to utilizing pressurized fluids. The term "pressurized fluid" as used therein is intended to include a fluid such as compressed air as well as hydraulic fluid such as oil. In brief, however, essentially any actuating means capable of providing a biasing force, which is controllable in response to obtaining a given set of sensings may be employed to cause the movement of the movably mounted member positioned in the gate of the mold.

In the preceding description, reference has been made to the material from which the parts are to be molded as comprising a fluid synthetic resin. It is to be understood, however, as used herein that the term fluid synthetic resin is intended to include thermoplastic as well as thermoset substances. Thermoplastics are generally heated in the 300°-700°F temperature range, and the cavity pressure control system may be designed for this operating range. Thermoset substances are generally processed in the 200°-500°F range, and the cavity pressure control system 24 may also be used through suitable circuit modifications for this type of material. In addition, cavity pressure control system 24 is capable of being used to adjust fluid metal temperature such as zinc, aluminum, brass etc., for those metal forming processes where the metal will first be melted, then forced into shape, and then cooled.

Thus, it can be seen that the present invention provides a novel and improved cavity pressure control system which is particularly adapted for embodiment in molds of the type utilized in injection molding systems. The control system of the present invention is capable of ensuring the production of molding parts having a high degree of reproducibility. Further, the subject control system is capable of being employed to produce parts having the same properties both where the parts are produced by means of plural cavities in a single mold as well as where such parts are produced through successive operations of the same molds. In accord with the invention a control system has been provided which is operable for molding articles from fluid synthetic resins where the resin may be either a thermoplastic or a thermoset substance and wherein the pressure of the resin in the mold cavity is controlled by varying the temperature of a heating means located in the path of flow of the resin to the mold cavity. Moreover, a cavity pressure control system has been provided wherein the pressure of the resin in the mold cavity is capable of being controlled by varying the position of a member in the gate relative to the entrance of the cavity to adjust the size of the passage through which the resin flows. Finally, a cavity pressure control system has been provided which is capable of reliably controlling the production of parts having a high degree of reproducibility while yet being relatively inexpensive to manufacture and relatively easy to install in present molds.

Having thus described the invention, we claim:

1. A mold provided with a cavity pressure control system comprising:
   a. a mold having at least one mold cavity and a passage communicating with said mold cavity to provide for the flow of moldable material to said mold cavity;
   b. heating means supported in said mold at a point along the length of said passage for heating the moldable material as the latter flows to said mold cavity;
   c. sensing means mounted within said mold for sensing the pressure of the material in said mold; and
   d. control means connected in circuit relationship with said sensing means and said heating means, said control means controlling the operation of said heating means to vary the temperature of the material flowing thereby in relation to the pressure of the material in said mold sensed by said sensing means whereby the pressure profile of the material is established and maintained in said mold.

2. A mold provided with a cavity pressure control system as set forth in claim 1 wherein the moldable material comprises a fluid synthetic resin, said heating means is supported within said passage in spaced relation to the entrance of said mold cavity.

3. A mold provided with a cavity pressure control system as set forth in claim 1 wherein said sensing means includes means for remotely sensing the pressure of the material in said mold and transducer means for transforming the pressure measurements obtained from said mold into electrical output signals corresponding thereto for transmission to said control means.

4. A mold for molding parts from fluid synthetic resins comprising:
   a. a mold structure including at least a pair of mold cavities, and passage means communicating with said pair of mold cavities to provide for the flow of fluid synthetic resin to said mold cavities;
   b. at least one of said pair of mold cavities being provided with a cavity pressure control system; and
   c. said cavity pressure control system including heating means for heating the resin as the latter flows to at least one of said pair of mold cavities, sensing means for sensing the pressure of the resin in at least one of said pair of mold cavities, and control means connected in circuit relationship with said sensing means and said heating means for controlling the operation of said heating means to vary the temperature of the resin flowing thereby in relation to the pressure of the resin in at least one of said pair of mold cavities sensed by said sensing means whereby the pressure profile of the resin is established and maintained in at least one of said mold cavities.

5. A mold as set forth in claim 4 wherein said sensing means of said cavity pressure control system includes means for remotely sensing the pressure of the resin in at least one of said pair of mold cavities and transducer means for transforming the pressure measurements obtained from said at least one of said pair of mold cavities into electrical output signals corresponding thereto for transmission to said control means, and wherein said passage means comprises a sprue for receiving a flow of fluid synthetic resin from an external source thereof, a runner connected to said sprue for receiving therefrom a flow of fluid synthetic resin, and a pair of gates connecting said runner with the entrances of said pair of mold cavities to provide a flow of fluid synthetic resin from said runner to said pair of mold cavities.

6. A mold as set forth in claim 4 wherein said heating means comprises an electrical heating element fixedly mounted at a point along the length of said passage means in spaced relation to the entrance of said at least one of said pair of mold cavities for applying heat to the resin as the latter flows past said electrical heating element in flowing to said at least one of said pair of mold cavities.

7. A mold as set forth in claim 4 wherein said heating means comprises a fluid heated element fixedly mounted at a point along the length of said passage means in spaced relation to the entrance of said at least one of said pair of mold cavities for applying heat to the resin as the latter flows past said fluid heated element in flowing to said at least one of said pair of mold cavities.

8. A mold as set forth in claim 4 wherein said heating means comprises a band-like heating element encircling the side walls of said passage means at a point in spaced relation to the entrance of said at least one of said pair of mold cavities for applying heat to the resin as the latter passes through said band-like heating element in flowing to at least one of said pair of mold cavities.

9. A mold as set forth in claim 4 wherein the other of said pair of mold cavities is provided with a force actuator means, said force actuator means including force responsive means receiving a force applied thereto by the pressure of the resin in said other of said pair of mold cavities, and biasing means for applying a biasing force to said force responsive means opposing the force being applied thereto by the resin in said other of said pair of mold cavities whereby when the pressure of the resin in said other of said pair of mold cavities reaches a predetermined level an equilibrium is established between the forces being applied to said force responsive means.

10. A mold as set forth in claim 9 wherein said force responsive means comprises an ejector pin, and said biasing means comprises a pressurized fluid.

11. A mold as set forth in claim 9 wherein said force responsive means comprises an ejector pin, and said biasing means comprises a spring means.

12. A mold as set forth in claim 9 wherein said force responsive means comprises an ejector pin, and said biasing means comprises a pair of wedge-shaped members mounted for sliding movement relative to each other.

13. A mold provided with a cavity pressure control system comprising:
   a. a mold having at least one mold cavity and passage means communicating with said mold cavity to provide for the flow of moldable material to said mold cavity;
   b. positioning means movably mounted in said mold at a point along the length of said passage means for movement to vary the size of the flow passage through which the moldable material passes as the latter flows to said mold cavity;
   c. sensing means mounted within said mold for sensing the pressure of the material in said mold; and
   d. control means connected in circuit relationship with said sensing means and said positioning means, said control means controlling the movement of said positioning means to vary the size of the flow passage through which the material flows in relation to the pressure of the material in said mold sensed by said sensing means whereby the pressure profile of the material is established and maintained in said mold.

14. A mold provided wwith a cavity pressure control system as set forth in claim 13 wherein said sensing means of said cavity pressure control system includes means for remotely sensing the pressure of the material in said mold cavity and transducer means for transforming the pressure measurements obtained from said mold cavity into electrical output signals corresponding thereto for transmission to said control means, and wherein said passage means comprises a sprue for receiving a flow of moldable material from an external source thereof, a runner connected to said sprue for receiving therefrom a flow of moldable material, and a gate connecting said runner with the entrance of said mold cavity to provide a flow of moldable material from said runner to said mold cavity.

15. A mold provided with a cavity pressure control system as set forth in claim 14 wherein said positioning means comprises a member mounted in said mold for movement within said gate relative to the entrance of said mold cavity, and means connected to said control means for causing movement of said member in response to signals provided from said control means.

* * * * *